(12) United States Patent
Zhang (10) Patent No.: US 12,471,694 B2
(45) Date of Patent: Nov. 18, 2025

(54) MULTI-FUNCTIONAL PROTECTION CASE FOR PORTABLE ELECTRONIC DEVICE

(71) Applicant: Yangjiang Ningwo Trading Co., Ltd., Yangjiang (CN)

(72) Inventor: Weixuan Zhang, Yangjiang (CN)

(73) Assignee: Yangjiang Ningwo Trading Co., Ltd., Yangjiang (CN)

( * ) Notice: Subject to any disclaimer, the term of this patent is extended or adjusted under 35 U.S.C. 154(b) by 0 days.

(21) Appl. No.: 19/094,568

(22) Filed: Mar. 28, 2025

(65) Prior Publication Data
US 2025/0221518 A1 Jul. 10, 2025

(51) Int. Cl.
A45F 5/00 (2006.01)
A45C 1/06 (2006.01)

(52) U.S. Cl.
CPC .............. *A45F 5/1516* (2025.01); *A45C 1/06* (2013.01)

(58) Field of Classification Search
CPC ......... A45C 11/00; A45C 11/002; A45C 1/06; A45F 2005/006; A45F 2005/008; A45F 5/00; A45F 5/1516; H04B 1/3888
USPC ................. 455/575.8; 206/320, 305, 576, 38
See application file for complete search history.

(56) References Cited

U.S. PATENT DOCUMENTS

| 8,199,475 | B2 * | 6/2012 | Yeh ........................ G06F 1/1624 455/575.4 |
| 8,418,852 | B2 * | 4/2013 | Ziemba ................ A45C 11/182 |
| 8,596,449 | B2 * | 12/2013 | Mongan ............... A45C 11/182 206/39 |
| 8,833,379 | B1 * | 9/2014 | Kaplan .................. A45D 33/26 206/823 |
| 8,922,985 | B2 * | 12/2014 | Richardson ........... G06F 1/1628 361/679.55 |
| 10,177,804 | B2 * | 1/2019 | Hill .......................... A45C 1/06 |
| 10,383,416 | B2 * | 8/2019 | Hynecek ................ A45C 11/00 |
| 2006/0042971 | A1 * | 3/2006 | Holmes .................. A45D 33/22 206/235 |
| 2014/0066142 | A1 * | 3/2014 | Gipson ................ H04B 1/3888 455/575.8 |
| 2014/0116898 | A1 * | 5/2014 | Lee ...................... H04B 1/3888 206/38 |
| 2014/0216976 | A1 * | 8/2014 | Conarro ............... A45D 33/006 206/525 |
| 2014/0228082 | A1 * | 8/2014 | Morrow ............... H04B 1/3888 455/575.8 |

(Continued)

FOREIGN PATENT DOCUMENTS

CN 216391119 U 4/2022
CN 220457467 U 2/2024

*Primary Examiner* — Chun Hoi Cheung (57) ABSTRACT

A multi-functional protection case for a portable electronic device, including: a casing and a rear cover; the casing is provided with an device accommodating chamber for accommodating the portable electronic device; the rear cover is located at a back of the casing and is rotatably connected to the casing; a card accommodating chamber is defined on the rear cover, and the card accommodating chamber is configured to store card; and an elastic clip is provided on the rear cover. The multi-functional protective case of this portable electronic device avoids the appearance of the multi-functional protective case of the portable electronic device from becoming abrupt by opening a card accommodating chamber inside the back cover. At the same time, the card is clipped by an elastic clip to improve the stability of card storage.

9 Claims, 8 Drawing Sheets

(56) References Cited

U.S. PATENT DOCUMENTS

| | | | |
|---|---|---|---|
| 2014/0251368 A1* | 9/2014 | Lawson | A45C 11/182 |
| | | | 206/37 |
| 2015/0334212 A1* | 11/2015 | Sandu | H04M 1/21 |
| | | | 455/575.1 |
| 2016/0014922 A1* | 1/2016 | Banerjee | A45C 7/0031 |
| | | | 206/38 |
| 2016/0088912 A1* | 3/2016 | Lawson | A45C 13/008 |
| | | | 206/38 |
| 2016/0206065 A1* | 7/2016 | Ehrlich | H04B 1/3888 |
| 2016/0374443 A1* | 12/2016 | Kim | A45C 11/182 |
| | | | 206/38 |
| 2017/0163305 A1 | 6/2017 | Bao | |
| 2018/0323818 A1* | 11/2018 | Hill | A45C 11/00 |
| 2021/0244146 A1* | 8/2021 | Shields | H04W 4/80 |
| 2023/0244124 A1* | 8/2023 | Bos | G03B 15/05 |
| | | | 362/319 |
| 2024/0148120 A1* | 5/2024 | Bohman | A45C 11/00 |

* cited by examiner

MULTI-FUNCTIONAL PROTECTION CASE FOR PORTABLE ELECTRONIC DEVICE

TECHNICAL FIELD

The present disclosure relates to the technical field of protection case technology, in particular to a multi-functional protection case for portable electronic device.

BACKGROUND

With the development of technology, the various functions of portable electronic device, such as mobile phones have become more sophisticated, and portable electronic device has gradually become an indispensable device in people's daily life. During the process of carrying a portable electronic device, people often use protection case to protect it. At the same time, there are other daily tools that need to be carried, such as bus card, identification card or bank card. A single-function protection case is difficult to meet the requirements of carrying card.

As a result, protection case with cardholders have appeared, combining card and portable electronic device together to reduce the number of items people need to carry. However, these protection case with cardholders are not very practical, as the card are not securely stored. Additionally, the design of the cardholder makes the protection case appear bulky and inconvenient to use.

SUMMARY

The present disclosure provides a multi-functional protection case for a portable electronic device, to solve the technical problem of bulky appearance and unstable card storage of protective case in existing technology.

To realize the above objective, the present disclosure provides a multi-functional protection case for a portable electronic device, including a casing and a rear cover; the casing is provided with an device accommodating chamber for accommodating the portable electronic device; the rear cover is located at a back of the casing and is rotatably connected to the casing; a card accommodating chamber is defined on the rear cover, and the card accommodating chamber is configured to store card; and an elastic clip is provided on the rear cover.

Furthermore, the rear cover includes a camera adapting cover, and the elastic clip is fixed to the camera adapting cover, the elastic clip is inclined.

Furthermore, the elastic clip includes a fixing end, a contacting end, and an extension part; the fixing end is fixedly connected to a lower end of the camera adapting cover, the contacting end is in contact with an inner surface of the card accommodating chamber, and the extension part is connected with the contacting end.

Furthermore, a guiding plate is provided on a lower frame of the card accommodating chamber, the guiding plate is configured to guide the card to slide out smoothly.

Furthermore, the elastic clip is positioned on a vertical central axis of the card accommodating chamber.

Furthermore, the rear cover and the casing are connected by a damping hinge.

Furthermore, the casing is further provided with a camera hole, the camera hole is communicated with the device accommodating chamber; a through hole is defined on the rear cover, and a shape of the through hole is matched with that of the camera hole.

Furthermore, also includes a sliding cover, which is slidably connected to the rear cover, the sliding cover is configured to open or close the through hole.

Furthermore, a stylus slot is defined on a side of the casing.

Furthermore, a groove is provided on a back of the casing, the groove is matched with the elastic clip.

The present disclosure further provides the multi-functional protection case for the portable electronic device, including the casing and the rear cover, the casing is provided with the device accommodating chamber for accommodating the portable electronic device, to protect the portable electronic device. The rear cover is located at the back of the casing and is rotatably connected to the casing, and the rear cover is fitted with the casing, So as to avoid the appearance of the multi-functional protection case became bulky and abrupt. When storing card, turning and opening the rear cover. There is a card accommodating chamber inside the rear cover that can store card. And an elastic clip is provided on the rear cover, which places the card between the elastic clip and the card accommodating chamber, and clips the card in the card accommodating chamber through the elastic clip, thereby improving the stability of card storage.

BRIEF DESCRIPTION OF THE DRAWINGS

To clearly explain the technical solutions of the present disclosure or the prior art, a brief introduction to the accompanying drawings required for the description of the embodiments or prior art will be given below. It is apparent that the drawings described below are some embodiments of the present disclosure, and for those skilled in the art, without the need for inventive effort, other drawings can also be derived from these drawings.

DESCRIPTION OF THE REFERENCE NUMERAL 1 casing, 11 device accommodating chamber, 12 camera hole, 13 groove;
2 rear cover, 21 card accommodating chamber, 211 lower frame, 22 elastic clip, 221 fixing end, 222 contacting end, 223 extension part, 23 guiding plate, 24 through hole, 25 sliding cover, 26 camera hole assembly, 261 first camera hole, 262 second camera hole, 263 flashing hole, 27 camera adapting cover;

3 stylus slot, 4 damping hinge, 5 card.

DETAILED DESCRIPTION OF THE EMBODIMENTS

The technical solutions in the embodiments of the present disclosure will be described clearly and completely with reference to the accompanying drawings in the embodiments of the present disclosure. Obviously, the described embodiments are only a part of the embodiments of the present disclosure rather than all of them. Based on the embodiments in the present disclosure, all other embodiments obtained by those skilled in the art without creative work shall fall within the scope of protection of the present disclosure.

Figure 1:
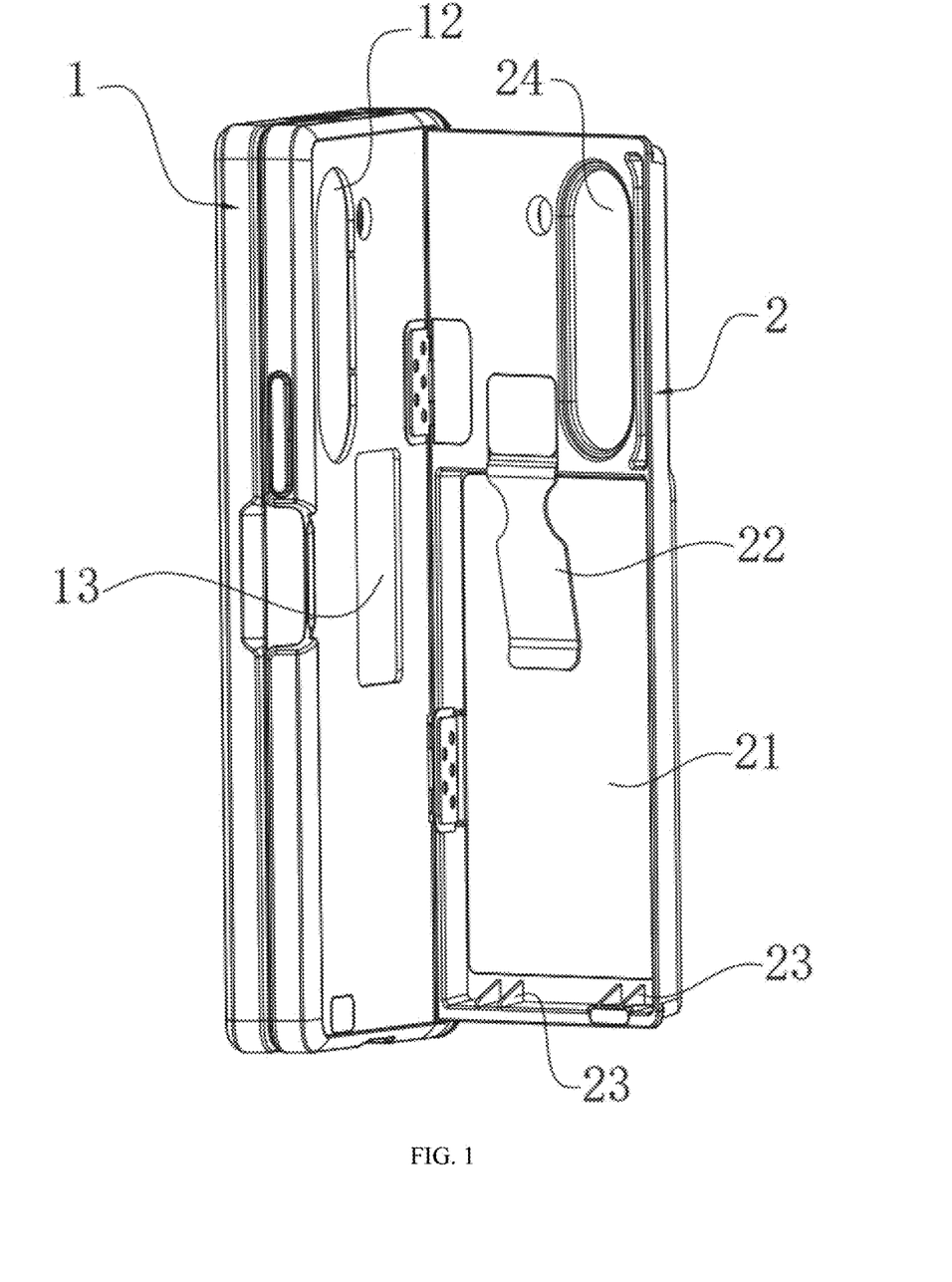
FIG. 1 is a schematic structural diagram of a multi-functional protection case for a portable electronic device according to an embodiment of the present disclosure.

Referring to FIG. 1, the present disclosure provides a multi-functional protection case for a portable electronic device, including a casing 1 and a rear cover 2. The casing 1 is provided with an device accommodating chamber 11 for accommodating the portable electronic device. The rear cover 2 is located at a back of the casing 1 and is rotatably connected to the casing 1. A card accommodating chamber 21 is defined on the rear cover 2, and the card accommodating chamber 21 is configured to store card 5. An elastic clip 22 is provided on the rear cover 2. The rear cover 2 includes a camera adapting cover 27. one end of the elastic clip 22 is fixedly connected to a camera adapting cover 27 of the rear cover 22, and the other end of the elastic clip 22 is in contact with the inner surface of the card accommodating chamber 21.

Please refer to FIGS. 1 to 5, in the present embodiment, the casing 1 is exemplified as the multi-functional protection case for a folding portable electronic device, designed to protect a folding portable electronic device. The folding portable electronic device in the present embodiment is also taken as an example of a portable electronic device. In different embodiments, the casing 1 can also be made as a case for a regular flat-screen portable electronic device or a curved-screen portable electronic device, without being restricted here. Since the casing 1 is used to protect the portable electronic device and prevent it from being damaged, a device accommodating chamber 11 is provided in the casing 1. The portable electronic device is placed into the device accommodating chamber 11, and the casing 1 wraps around the portable electronic device, achieving the protective effect.

It can be understood that after the device accommodating chamber 11 is defined in the casing 1, the surface facing the device accommodating chamber 11 is the inner surface, and the opposite surface is the outer surface. The portable electronic device is placed into the device accommodating chamber 11. A card accommodating chamber 21 is defined on the rear cover 2, and the card accommodating chamber 21 is designed on the inner surface of the rear cover 2 that is closer to the casing 1. As shown in FIG. 1, an edge of the rear cover 2 is connected to an edge of the casing 1, and the rear cover 2 is rotatably connected to the casing 1. Therefore, the rear cover 2 can rotate relative to the casing 1 to either a closed position, a supporting position or an opening position. When the rear cover 2 rotates to fit against the casing 1, the card accommodating chamber 21 is covered by the casing 1, preventing the card 5 in the card accommodating chamber 21 from falling out and improving the stability of storing card 5 in the card accommodating chamber 21.

When the rear cover 2 is opened in a direction away from the casing 1, it enters a supporting position, an angle is formed between the rear cover 2 and the casing 1, with the rear cover 2 that holds the card accommodating chamber 21 unfolding. At this point, card to be stored can be placed into the card accommodating chamber 21, achieving the effect of card storage. It can be understood that, since the card accommodating chamber 21 needs to store card 5, the size of the card accommodating chamber 21 correspond to the size of the card 5, allowing the card 5 to fit entirely inside the card accommodating chamber 21. Preferably, the card to be stored are typically bank card or public transportation card of similar size. Therefore, the card accommodating chamber 21 is designed to correspond to the size of a bank card, allowing the bank card to fit precisely into the card accommodating chamber 21. Of course, the dimensions of the card accommodating chamber 21 can also be designed to be larger than that of a bank card, allowing the card accommodating chamber 21 to accommodate larger-sized card.

Furthermore, in order to improve the stability of card storage, an elastic clip 22 is also provided inside the card accommodating chamber 21. Since the elastic clip 22 has elasticity, it can be deformed. When a card needs to be stored, moving the card to be stored toward the end of the elastic clip 22 that faces the inner surface of the card accommodating chamber 21. This pushes the elastic clip 22 toward the inner side of the card accommodating chamber 21. Because the other end of the elastic clip 22 is fixedly connected to the side of the card accommodating chamber 21, the end of the elastic clip 22 that is pushed upward will, due to its elasticity, clip the card 5 tightly inside the card accommodating chamber 21, improving the stability of card storage.

In the present embodiment, the card accommodating chamber 21 is formed on the inner surface of the rear cover 2 that fits against the casing 1, the card accommodating chamber 21 is integrated into the rear cover 2. This prevents the multi-functional protective case for the portable electronic device from appearing bulky, and by sealing the card accommodating chamber 21 with the rear cover 2 fitting against the casing 1, the stability of the card storage in the card accommodating chamber 21 is enhanced. Additionally, the elastic clip 22 inside the card accommodating chamber 21 further secures the card, increasing the stability when storing card.

In one embodiment, one end of the elastic clip 22 is connected to a lower end of the camera adapting cover 27, and the other end of the elastic clip 22 is in contact with the inner surface of the card accommodating chamber 21, thus arranging the elastic clip 22 at an inclined angle within the card accommodating chamber 21.

Figure 4:
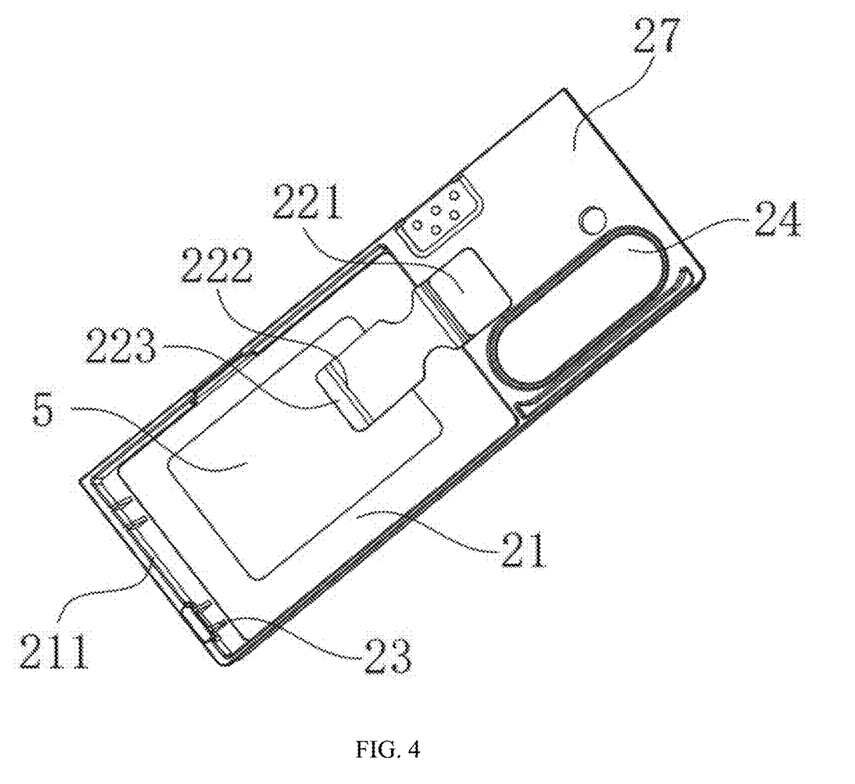
FIG. 4 is a schematic structural diagram of the rear cover in FIG. 1.
Figure 5:
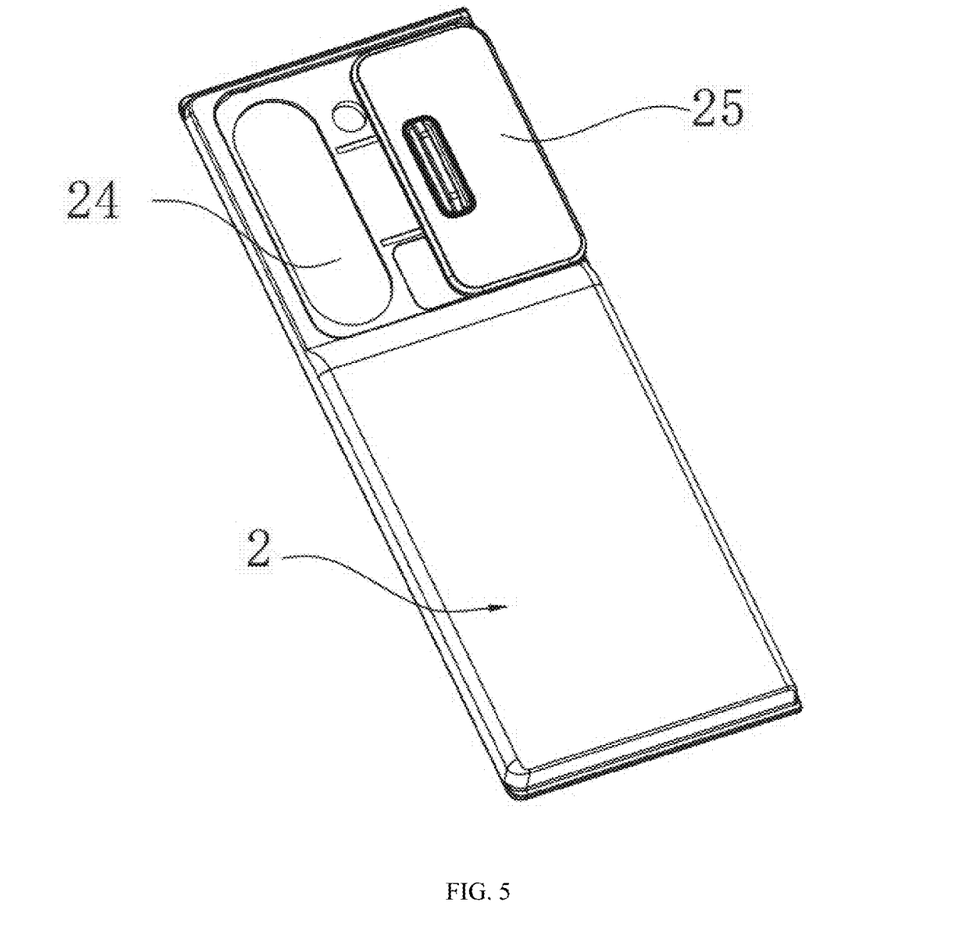
FIG. 5 is a schematic structural diagram of the rear cover in FIG. 4 from another view.

As shown in FIGS. 1 and 4, the elastic clip 22 is arranged at an incline inside the card accommodating chamber 21. One end of the elastic clip 22, near the center of the card accommodating chamber 21, contacts the inner surface of the card accommodating chamber 21, while the other end is connected to the side of the card accommodating chamber 21 at the top, creating a gap between the elastic clip 22 and the card accommodating chamber 21. When storing a card, after the card pushes the end of the elastic clip 22 that is in contact with the card accommodating chamber 21, the card enters the gap between the elastic clip 22 and the card accommodating chamber 21. This design allows the card to be inserted by simply pushing the end of the elastic clip 22, improving the ease of card storage. Additionally, by contacting the card with one end of the elastic clip 22, the card is pressed tightly within the card accommodating chamber 21, and the other end of the elastic clip 22 is fixedly connected to the side of the card accommodating chamber 21, providing a point of force, thus extending the effective lever arm and further improving the stability of the card storage in the card accommodating chamber 21.

In one embodiment, the elastic clip 22 includes a fixing end 221, a contacting end 222, and an extension part 223. The fixing end 221 is fixedly connected to the camera adapting cover 27, and the lower end of the camera adapting cover 27 is level with the lower end of the fixing end 221. The contacting end 222 is in contact with the inner surface of the card accommodating chamber 21, and the extension part 223 is connected to the contacting end 222. The extension part 223 gradually increases the distance from the inner surface of the card accommodating chamber 21 as it moves away from the fixing end 221.

Please refer to FIGS. 1 and 4, the elastic clip 22 is flat. The elastic clip 22 has two ends: the fixing end 221 and the contacting end 222, with the fixing end 221 being fixedly connected to the lower end of the camera adapting cover 27, and the contacting end 222 being in contact with the inner surface of the card accommodating chamber 21. The extension part 223 is connected to the contacting end 222, and extends upward and away from the fixing end 221. The "extends upward" described here refers to the direction opposite to the inner surface of the card accommodating chamber 21, with ta height of the upward extension part 223 being less than a depth of the card accommodating chamber 21 to avoid protruding from the cavity.

Because the extension part 223 is arranged at an incline, during card storage process, the card can gradually contact the inclined surface of the extension part 223, thus pushing the contacting end 222 upward. The guidance provided by the extension part 223 ensures that the card moves smoothly and makes it easier to push the elastic clip 22 upward.

Furthermore, to ensure smoother contact between the card and the elastic clip 22, the junction between the extension part 223 and the contacting end 222 is designed with a rounded corner, making the card's contact smoother.

In one embodiment, on a bottom frame 211 of the card accommodating chamber 21, along the direction the card exits the cavity, is provided with a guiding plate 23, which helps guide the card's exit.

Refer to FIGS. 1 and 4, a guiding plate 23 is on a lower frame of the card accommodating chamber 21. In the present embodiment, four guiding plates 23 are symmetrically arranged to evenly distribute the force on the card. In different embodiments, the number of guiding plates 23 can be adjusted based on actual requirements; which is not restrictive. As the card moves toward the fixing end 221, it slides into the gap between the elastic clip 22 and the card accommodating chamber 21, where it is pressed tightly by the elastic clip 22. Therefore, the side opposite the fixing end 221 is the direction from which the card exits the card accommodating chamber 21. When the card needs to be removed from the card accommodating chamber 21, it is moved in the direction away from the fixing end 221. At this point, the side of the card contacts the side of the card accommodating chamber 21. Since the side of the card is parallel to the side of the card accommodating chamber 21, the card will fit tightly against the side of the card accommodating chamber 21, making it difficult to remove the card.

In the present embodiment, the guiding plate 23 is arranged on the side of the card accommodating chamber 21. The guiding plate 23 is inclined and arranged along the direction the card exits the card accommodating chamber 21. When the card moves in the direction away from the fixing end 221, it contacts the guiding plate 23 and is guided to slide upward along the inclined surface of the guiding plate 23. Since the card also has some elasticity, it can smoothly slide along the guiding plate 23 until it completely exits the card accommodating chamber 21.

In the present embodiment, by setting the guiding plate 23 on the lower frame 211 of the card accommodating chamber 21, the card can slide smoothly along the inclined surface of the guiding plate 23 when exiting the cavity, making card removal easier.

In one embodiment, the elastic clip 22 is positioned on a vertical central axis of the card accommodating chamber 21, in the direction the card exits the cavity.

Referring to FIGS. 1 and 4, the card accommodating chamber 21 has a rectangular shape, corresponding to the shape of the rectangular card. In the present embodiment, the elastic clip 22 is arranged along the width direction of the card accommodating chamber 21, and the length direction of the elastic clip 22 aligns with the length direction of the card accommodating chamber 21. In different embodiments, the elastic clip 22 can also be arranged along the length direction of the card accommodating chamber 21, without restriction here.

Furthermore, by placing the elastic clip 22 along the vertical central axis of the card accommodating chamber 21, when the card slides into the gap between the elastic clip 22 and the card accommodating chamber 21, it will be evenly pressed by the elastic clip 22, improving the stability of the card storage.

In one embodiment, the rear cover 2 is connected to the casing 1 via a damping hinge 4. Preferably, in the present embodiment, the damping hinge 4 is used for the rotational connection between the rear cover 2 and the casing 1. This allows the rear cover 2 to maintain its position after rotating relative to the casing 1, keeping the angle between the rear cover 2 and the casing 1 unchanged, providing support. Typically, the angle between the rear cover 2 and the casing 1 after rotation is within the range of 0° to 180°. When the angle is 0°, the rear cover 2 is flush with the casing 1. Preferably, using the damping hinge connection, the angle between the rear cover 2 and the casing 1 can be maintained at 30°, 45°, 60°, 90°, or 135°, among others, without listing all possibilities here.

When the rear cover 2 rotates relative to the casing 1 and is maintained at a fixed angle by the damping hinge 4, the rear cover 2 can support the casing 1. Additionally, the rear cover 2, casing 1, and the tabletop form a triangular structure, improving overall stability.

In one embodiment, the casing 1 is provided with a camera hole 12 that communicates with the device accommodating chamber 11, exposing the camera of the portable electronic device. The rear cover 2 is provided with a through hole 24, with the number and shape of the through holes 24 matching those of the camera hole 12.

As shown in FIG. 1, a camera hole 12 is provided on the casing 1. Since most portable electronic devices are equipped with cameras, the casing 1 needs to have the camera hole 12 to avoid obstructing the camera. The portable electronic device is housed in the device accommodating chamber 11, so the camera hole 12 must be communicated the device accommodating chamber 11 to ensure that the camera of the portable electronic device inside the device accommodating chamber 11 is not obstructed.

The rear cover 2 is located on the back of the casing 1, and it can fit closely with the casing 1. To prevent the rear cover 2 from obstructing the camera, a through hole 24 is also provided on the rear cover 2. The shape, size, and position of the through hole 24 correspond to the shape, size, and position of the camera hole 12, ensuring that the camera of the portable electronic device is not blocked.

In another embodiment, the device also includes a sliding cover 25, which is slidably set on the rear cover 2 and is used to open or close the through hole 24.

Referring to FIGS. 1-5, in this embodiment, the camera hole 12 is set on a side of the rear cover. There is a flash hole adjacent to the camera hole 12. The sliding cover 25 is placed on the back of the rear cover 2 to facilitate its movement. The sliding cover 25 can slide towards the through hole 24 to cover it. When the through hole 24 is covered, the camera of the portable electronic device on the portable electronic device is blocked, preventing it from capturing images and improving user privacy and security. When the camera is needed for use, the sliding cover 25 can be moved in the direction away from the through hole 24, revealing the through hole 24 and removing the obstruction.

At the same time, by covering the through hole 24 with the sliding cover 25, the camera is also protected from direct contact with external objects. Since the camera module of the portable electronic device is a precise instrument, even slight wear can have a significant impact. Therefore, when the camera is not in use, covering it with the sliding cover 25 ensures that it is kept in a safe, enclosed space, increasing its safety and lifespan.

Figure 6:
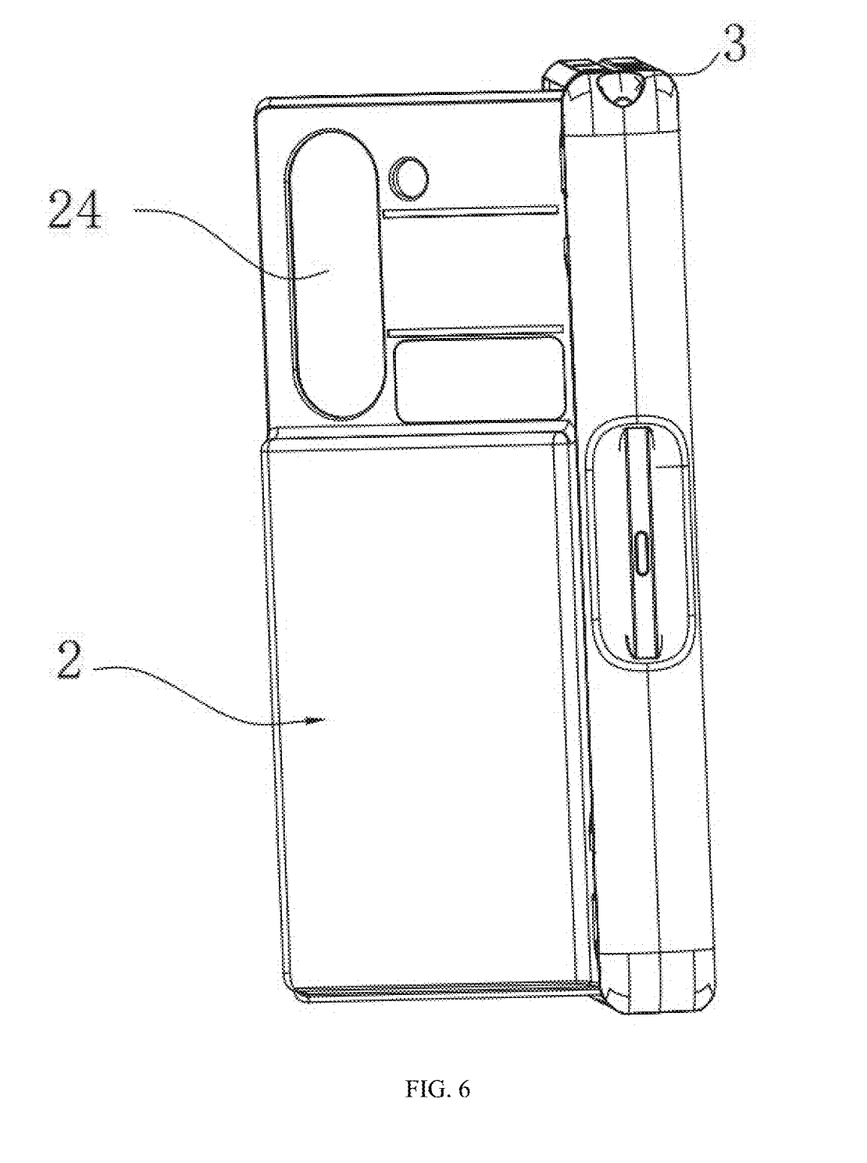
FIG. 6 is a schematic structural diagram of the multi-functional protection case for the portable electronic device according to another embodiment of the present disclosure.

As shown in FIG. 6, another embodiment of this application provides a multi-functional protection case without the sliding cover 25. When the portable electronic device's security is high enough, a multi-functional protective case for a portable electronic device without the sliding cover 25 can be selected. Because the casing 1 and rear cover 2 have a certain thickness, when the portable electronic device is placed in the device accommodating chamber 11 and then placed on a flat surface, the camera has a certain distance from the surface and does not make direct contact. This can also prevent wear and improve security and durability. Meanwhile, the removal of the sliding cover 25 enhances the cost-effectiveness of the multi-functional protection case.

Figure 7:
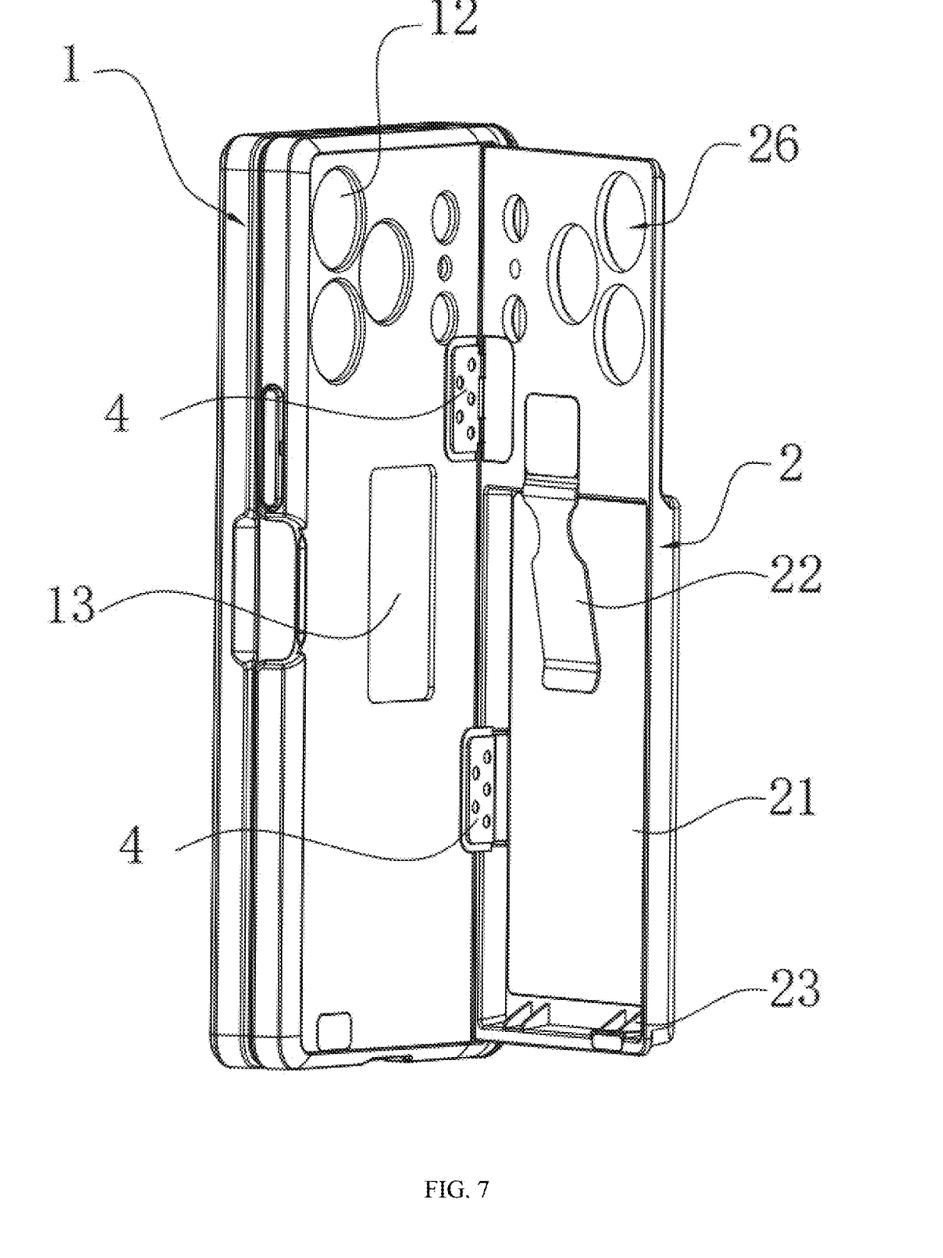
FIG. 7 is a schematic structural diagram of the multi-functional protection case for the portable electronic device according to another embodiment of the present disclosure.
Figure 8:
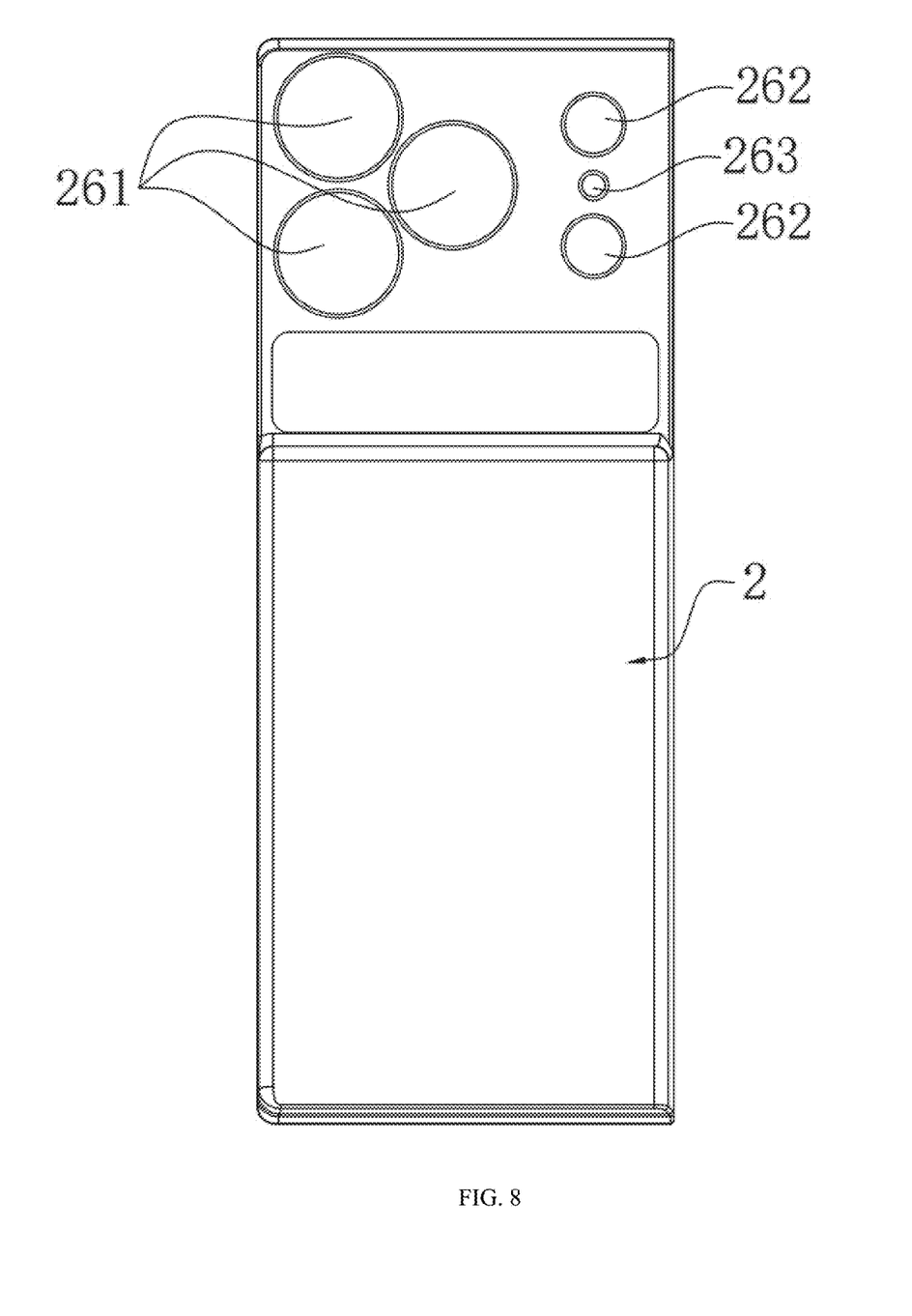
FIG. 8 is a schematic structural diagram of the rear cover in FIG. 7.

Please also refer to FIGS. 7 and 8, this application provides another embodiment. In this embodiment, the camera module on the portable electronic device is larger. Along a width direction, the camera module occupies the most area of an upper part of the rear cover. A corresponding hole is provided on the casing 1 to prevent the camera module from being obstructed. As shown in FIG. 7, a camera hole assembly 26 is set on the rear cover 2, which includes three of the first camera holes 261, two of the second camera holes 262, and one of the flash hole 263. The three of the first camera holes 261 are arranged at the three vertices of a triangle, while the second camera holes 262 are arranged in a straight line along the length direction. Additionally, the flash hole 263 is provided between the two second camera holes 262, resulting in a large overall camera module space. Due to the limited space and the card accommodating chamber 21 being located beneath the camera hole assembly 26, installing a sliding cover 25 is not suitable. Thus, in this embodiment, no sliding cover 25 is adopted.

In one embodiment, a stylus slot is defined on the casing 1, used for placing a stylus pen based input device.

Figure 2:
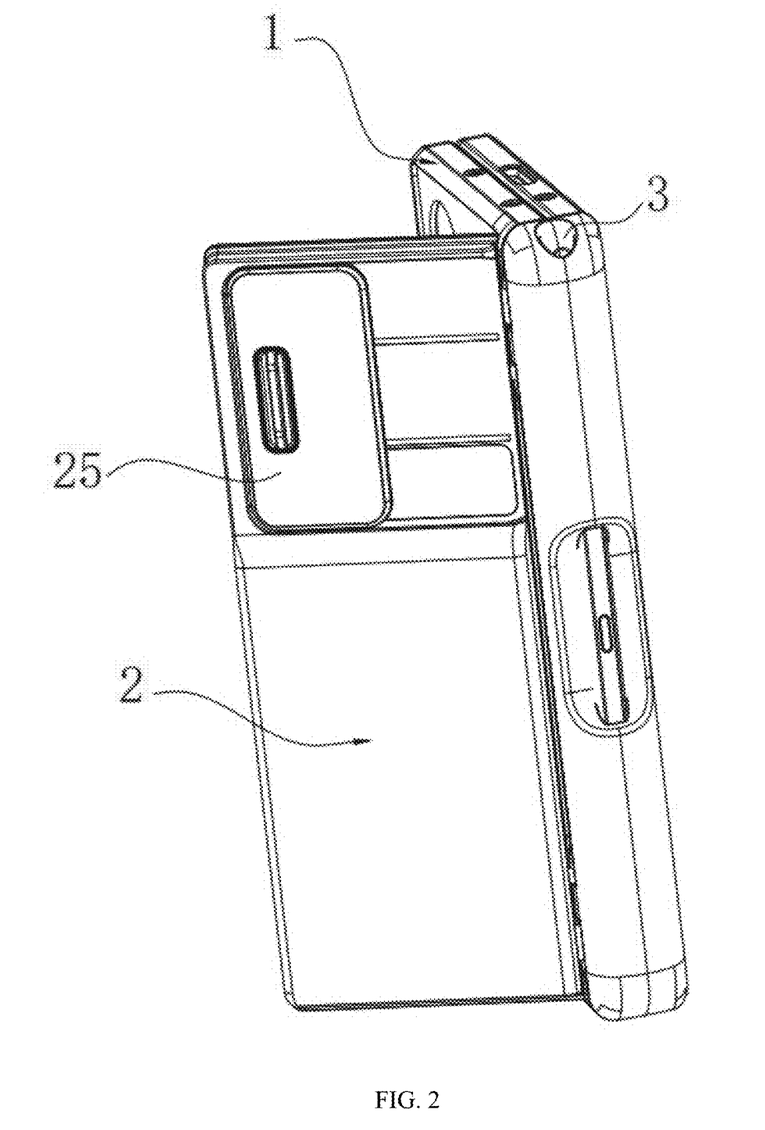
FIG. 2 is a schematic structural diagram of the multi-functional protection case for the portable electronic device in FIG. 1 from another view.
Figure 3:
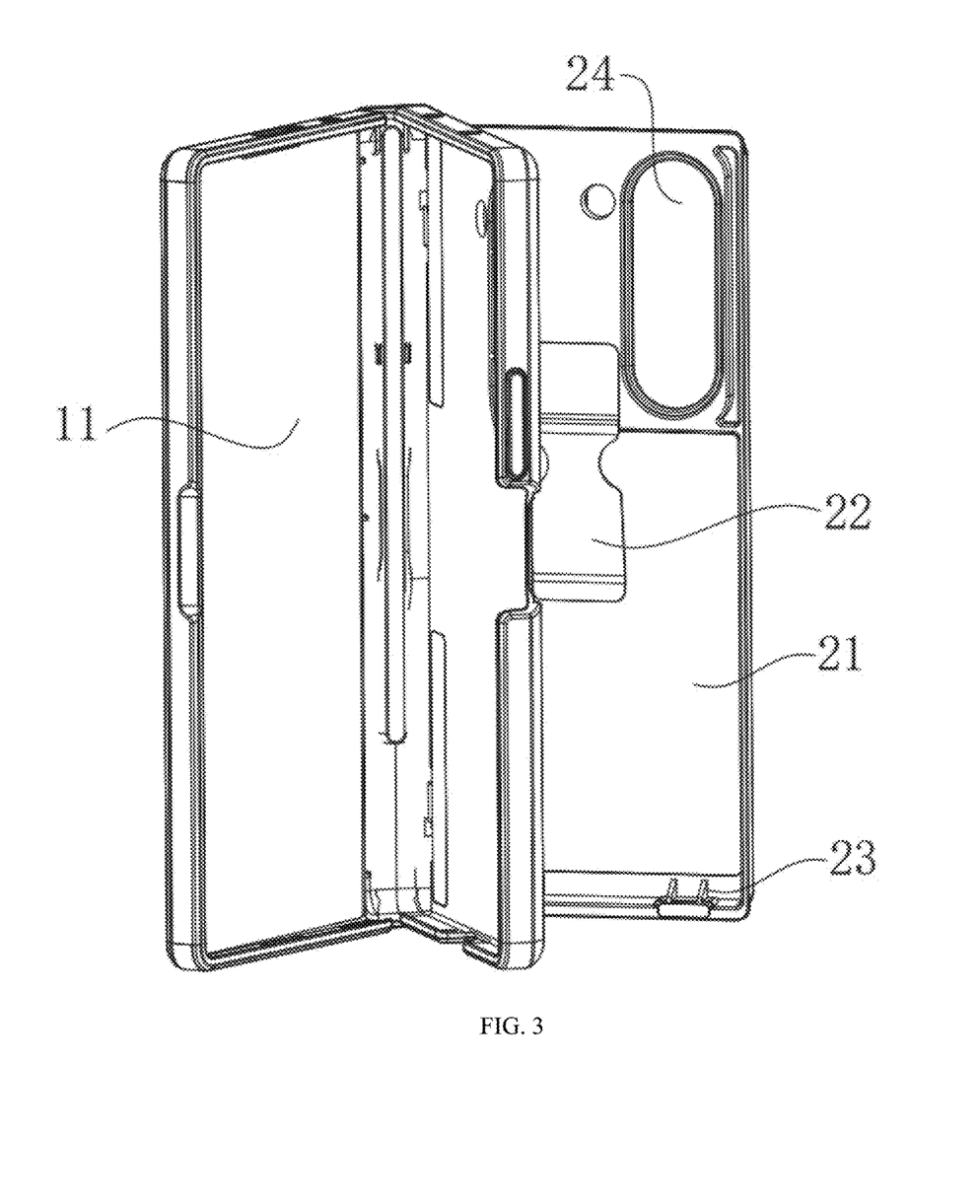
FIG. 3 is a schematic structural diagram of the multi-functional protection case for the portable electronic device in FIG. 1 with a rear cover being unfolded at a specified angle.

As shown in FIG. 2, because the casing 1 has a relatively large overall thickness, a stylus slot 3 is provided on the side of the casing 1. When the portable electronic device requires a stylus, it can be stored in the stylus slot 3 for easy carrying. Preferably, the stylus slot 3 is arranged along the length direction of the casing 1, so that the slot can accommodate a longer stylus.

In one embodiment, the back of the casing 1 also has a groove 13, the groove 13 is matched with the elastic clip 22. When multiple cards are stored in the card accommodating chamber 21, the elastic clip 22 may protrude from a horizontal plane where the camera adapting cover 27 is located, and the groove 13 is precisely used to accommodate the protruding elastic clamp 22, thereby avoiding the problem of not tightly fitting between the casing 1 and the rear cover 2.

Referring to FIG. 1, the fixing end 221 of the elastic clip 22 is connected to the top of the card accommodating chamber 21, i.e., it is connected to the surface where the rear cover 2 fits with the casing 1. An upwardly inclined extension part 223 is also connected to the contacting end 222. Therefore, when the card pushes the elastic clip 22 upwards, the extension part 223 protrudes from the surface of the rear cover 2, causing it to interfere with the fitting between the rear cover 2 and the casing 1. Thus, in this embodiment, a groove 13 is provided on the back of the casing 1, and its position corresponds to the location of the elastic clip 22. This ensures that when the rear cover 2 fits with the casing 1, the protruding extension part 223 can fit into the groove 13, preventing interference. This design ensures smooth functioning of the elastic clip 22 while allowing the rear cover 2 to fit securely with the casing 1.

Finally, it should be noted that the above are only some embodiments of the present disclosure, and neither the words nor the drawings can limit the protection scope of the present disclosure. Any equivalent structural transformation made by using the contents of the specification and the drawings of the present disclosure under the overall concept of the present disclosure, or directly/indirectly applied in other related technical fields are included in the protection scope of the present disclosure.

The invention claimed is:

1. A multi-functional protection case for a portable electronic device, comprising a casing and a rear cover;
   wherein the casing is provided with a device accommodating chamber for accommodating the portable electronic device;
   the rear cover is located at a back of the casing and is rotatably connected to the casing;
   wherein, a card accommodating chamber is defined on the rear cover, and the card accommodating chamber is configured to store card; and
   an elastic clip is provided on the rear cover;
   wherein the rear cover comprises a camera adapting cover, the elastic clip is fixed to the camera adapting cover, and the elastic clip is inclined.

2. The multi-functional protective case for the portable electronic device according to claim 1, wherein the elastic clip comprises a fixing end, a contacting end, and an extension part;
   wherein the fixing end is fixedly connected to a lower end of the camera adapting cover, the contacting end is in contact with an inner surface of the card accommodating chamber, and the extension part is connected with the contacting end.

3. The multi-functional protective case for the portable electronic device according to claim 1, wherein a guiding plate is provided on a lower frame of the card accommodating chamber, the guiding plate is configured to guide the card to slide out smoothly.

4. The multi-functional protective case for the portable electronic device according to claim 1, wherein the elastic clip is positioned on a vertical central axis of the card accommodating chamber.

5. The multi-functional protective case for portable electronic device according to claim 1, wherein the rear cover and the casing are connected by a damping hinge.

6. The multi-functional protective case for portable electronic device according to claim 1, wherein the casing is further provided with a camera hole, the camera hole is communicated with the device accommodating chamber;
   a through hole is defined on the rear cover, and a shape of the through hole is matched with that of the camera hole.

7. The multi-functional protective case for portable electronic device according to claim 6, wherein, further comprises a sliding cover, which is slidably connected to the rear cover, the sliding cover is configured to open or close the through hole.

8. The multi-functional protective case for portable electronic device according to claim 1, wherein a stylus slot is defined on a side of the casing.

9. The multi-functional protective case for portable electronic device according to claim 1, wherein a groove is provided on a back of the casing, the groove is matched with the elastic clip.

* * * * *